Oct. 4, 1949.                F. REINGRUBER                2,483,670
                           THERMOSTATIC SWITCH
                          Filed Jan. 25, 1945
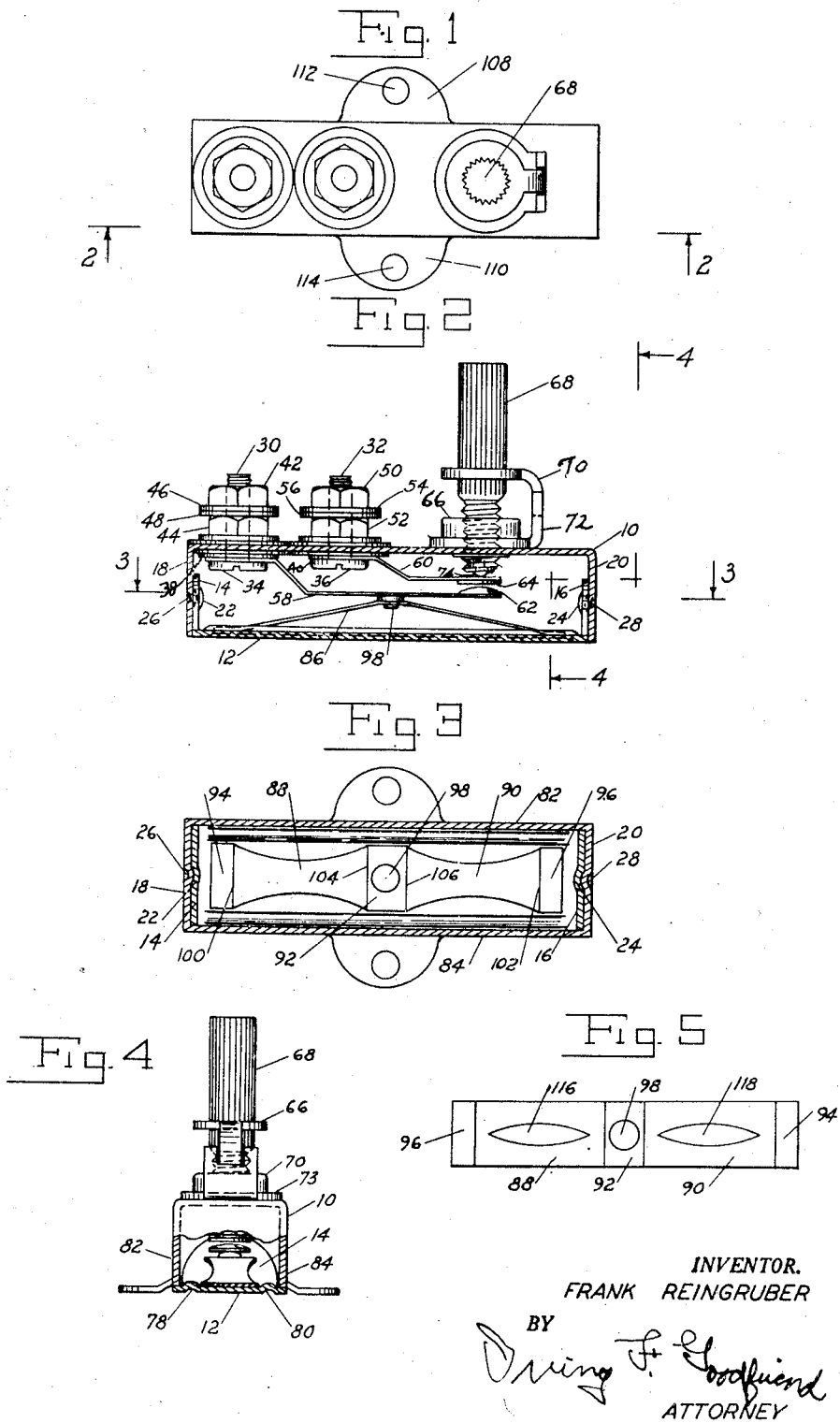
INVENTOR.
FRANK REINGRUBER
BY
ATTORNEY Patented Oct. 4, 1949

2,483,670

UNITED STATES PATENT OFFICE 2,483,670

THERMOSTATIC SWITCH

Frank Reingruber, New York, N. Y.

Application January 25, 1945, Serial No. 574,463

2 Claims. (Cl. 200—137)

The present invention relates to thermostats and more particularly to that type of thermostat which utilizes the differential heat expanding characteristics of two dissimilar metals.

In devices of this character, the magnitude of movement under the influence of heat of the expanding metal which actuates the electric switch of the thermostat is necessarily small. The present invention therefore contemplates utilizing the smallest degree of movement of the expanding metal to accomplish operation of the thermostat thereby providing one that is extremely sensitive.

My invention therefore, contemplates the provision of a thermostat that is so designed and constructed that a relatively small linear movement of the expanding metal is translated into a larger, multiplied or amplified movement of the element which operates the switch and thus provides a thermostat that reacts rapidly to small changes in temperature of the device which it controls.

My invention further contemplates the provision of a thermostat that is comparatively simple to assemble but which is nevertheless rugged for the service to which it will be subjected.

The thermostat of my invention is so designed that it may be applied in direct contact with a surface of the device, the temperature of which it will control, so that it will quickly react to relatively small changes in temperature and so provide a thermostat of increased sensitivity but in which any tendency to overshoot the temperature for which the thermostat is set is limited.

I have found by providing sections of reduced area in the metallic element that controls the thermostat switch, there will be obtained a greater magnitude of movement of the control element for a relatively small linear expansion of the heat sensitive metal.

My invention therefore contemplates the provision of a spring-like metallic element having a low coefficient of expansion which is uniformly cut away at certain portions thereof to provide sections of reduced area and so take advantage of this characteristic.

These, other and further objects and advantages of the present invention will be clear from the description which follows and the drawing appended thereto, in which Fig. 1 is a plan view of a thermostat according to my invention.

Fig. 2 is a section on the line 2—2 of Fig. 1.

Fig. 3 is a section on the line 3—3 of Fig. 2.

Fig. 4 is a section on the line 4—4 of Fig. 2.

Fig. 5 is a plan view of a modification of the spring like low coefficient of expansion element used in my invention.

Referring now to the drawing, I have shown, by way of example, an embodiment of my invention, which, for illustration, is to be applied to a device, such as an electric flat iron, having a flat surface or body, the temperature of which is to be controlled, and on the inside of which the thermostat may be mounted, as a separate unit, in good heat transfer contact therewith.

The operative elements of the temperature responsive mechanism of the thermostat, according to my invention, are housed within a casing which comprises the box like open bottom upper or cover member 10 and the lower or base member 12, which latter, as will be further explained, is the temperature expanding bar of the switch actuating dissimilar metallic combination.

The member 12 is formed from a metal having a relatively high coefficient of expansion, such as brass or aluminum, and has extensions at each end thereof which are bent upwardly at right angles to the bar portion to form the holding ears 14 and 16, which are sufficiently resilient to be pressed inwardly by the end walls 18 and 20 extending down on the cover member 10.

Each ear 14 and 16 and each wall 18 and 20 are peened to form the cooperating and interfitting depressed portions 22 and 24 and 26 and 28, which serve to hold the members 10 and 12 together when one is pressed and fitted into the other thereby causing the member 12 to be placed under compression.

The member 12, in use, is subjected to a continuous expanding or contracting action under the influence of the heated body and after some period of time tends to permanently "grow" in length. As a result, thermostats which utilize the dissimilar expanding characteristics of two metals are prone to change in the temperature settings thereof with use in which the temperature changes periodically from its high operative values to low room values.

I have found that by arranging as above the high coefficient expanding member 12 within a member 10 as described, this permanent growth is prevented and a thermostat having unchangeable characteristics is thereby provided.

The member 10 is provided with the conventional terminal posts 30 and 32, formed from a screw member, the heads 34 and 36 of which engage the inside of the member 10.

The heads 34 and 36 and the stems 30 and 32 are insulated from the cover 10 by conventional washers 38 and 40.

The terminal posts 30 and 32 are connected in series in the electrical heating circuit (not shown) by securing lead wires therefrom (also not shown) respectively to the post 30, as by the lock nuts 42 and 44 between the washers 46 and 48 and to the post 32 as by the lock nuts 50 and 52, between the washers 54 and 56.

The switch of the thermostat comprises the downwardly tensioned element 58, which is secured at one end to the post 30 between the head 34 and the washer 38 and the substantially paralleled positioned spring element 60, upwardly tensioned, which is secured at one end to the other terminal post 32 between the head 36 and the washer 40.

The spring element 58 has secured at its other end the contact point or button 62 and the spring like element 60, at its other end the corresponding contact point or button 64. As will be explained, the contact points or buttons 62 and 64 are normally held in engagement by the two dissimilar expansion members so that the electrical heating circuit is normally closed. Separation of the contact points or buttons opens the electrical heating circuit by the action which I shall further explain to discontinue heating the device and so allow it to cool.

In order to provide means for adjusting the operative limits of the thermostat, by limiting the separation of these contact points or buttons, I secure on the outside of the member 10, the collar 66, in which is mounted the calibrating member 68. The member 68 is in threaded engagement with the collar 66 and slidably frictionally carries on it the stop member 70, which engages the stop 72 when the member 68 is screwed into any selected position extending into the thermostat.

On the lower end of the member 68, I arrange the button 74 which is in contact with the spring like element 60 so that the calibrating member 68 bears against the member 60 and so determines the movement necessary to permit the button 62 to move away from the button 64 and thereby control the opening of the switch.

Upon threadedly moving the member 68 a selected distance into the interior of the housing, the opening of the switch comprised of the members 58 and 60, can be set so that the thermostat is arranged to open the heating circuit at the desired temperature.

In order to transversely strengthen the member 12 against possible flexing or bending in the direction of its length and so make it sufficiently rigid, I provide at each side thereof the longitudinal shoulders 78 and 80 on the outside of which the side walls 82 and 84 are positioned when the member 10 is snapped or fitted on the member 12.

In order to provide a means for opening and closing the thermostat switch, I secure to the base part of the member 12, in the manner to be further described, the control operating member 86 between the shoulders 78 and 80, which also serve to position it. The member 86 is of total length from end to end somewhat greater than the linear length of the base part of the member 12 and is formed from a spring like metallic material, such as relatively thin plate steel having a low coefficient of expansion and of characteristics such that the resiliency is retained at the highest temperatures to which it may be subjected to in the normal operation of the device which the thermostat will control.

The member 86 comprises the straight or flat unbowed elements 88 and 90, which extend down from the central flat and horizontal platform 92 at an inclination thereto into the toes or stubs 94 and 96 at each end thereof.

The toes or stubs 94 and 96 are secured to the member 12 in any suitable manner, as by welding, soldering or riveting it thereto.

At the center of the platform 92, I mount the insulating button 98 on which the element 58 rides and against which it is downwardly tensioned, the platform 12 being normally tensioned upwardly thereagainst. As the member 12 expands, it will pull the platform 92 downward thereby causing the button 62 to move away from the button 64 and thus open the switch.

The greater the downward movement of the platform 92 for slight expansion of the member 12, the more sensitive will be the thermostat. I have found that greater movement of the central platform on the member 86 will be obtained by forming a line of bend 100 and 102 at the junction of the leg 88 with the toe or stub 94 and the leg 90 with the toe or stub 96 and a line of bend 104 and 106 where the leg 88 and the leg 90 join the platform 92.

I have further found that the movement of the member 86 will be further amplified by decreasing the area of each leg 88 and 90 at that portion thereof between the stubs 94 and 96 and the platform 92.

I accomplish this by cutting out each leg on each side thereof, preferably in the form of a half ellipse, so that the center part thereof is of the smallest area which gradually and uniformly increases to the outer ends at the stub and the platform.

Since the center portions are of the smallest area, they will be the weakest and will flex or bend the most under the pull of the expanding bar 12 and since a line of bend is formed at the junction of the toe and platform, these latter will remain relatively rigid. By reason of this construction, the expanding movement of the bar is translated to a movement down of the central platform which is greatly amplified, it being understood that in thermostats movements of only a few thousandths of an inch are critical.

In order to secure my thermostat to the surface the temperature of which is to be controlled by it, I form on each side wall 82 and 84 of the cover member 10, the ears 108 and 110 in each of which are provided openings 112 and 114, which are to receive fastening screws. This construction also serves to operatively hold the member 12 in contact with the surface but yet leaves the member 12 free to expand under the influence of heat.

Referring now to Fig. 5, I have therein illustrated a modified form of the control member 86 in which a weakened intermediate portion, that is one of reduced metallic area is formed by punching out from the center of each leg 88 and 90 the openings 116 and 118. These openings are preferably in the form of an ellipse, the major axis of which is in the direction of length of the legs and the minor axis of which is along the width of the legs, substantially at the center thereof.

It will thus be seen that in the modification illustrated in Fig. 5, the area of the metallic intermediate part of each leg increases uniformly from the center thereof to the toe and the platform so that the largest amount of flexure will occur at the center of each leg where the weakest section is formed.

It will now be apparent that I have provided a sensitive thermostat in which a relatively small linear movement of a member expanding under heat is translated into a comparatively greater, multiplied or amplified movement of the member which controls the operation of the thermostat switch.

It will be further apparent that I have provided a thermostat in which the heat expanding member will not permanently grow in length under the action of heat.

While I have illustrated specific embodiments of my invention, I do not intend to be limited to the specific details of construction shown, modifications of which within the spirit and scope of the invention will occur to those skilled in the art. Hence I intend to claim my invention as broadly as the prior art and the scope of the appended claims permit.

I claim:

1. In a thermostat, a cover member open at the bottom and having a top wall and end walls and side walls depending therefrom, a bar member having upturned ears at each end thereof and positioned inside of the cover member with the ears against the end walls thereof, a securing flange extending from each side wall of the cover member, said bar member having strengthening shoulders at each side thereof, extending from one upturned ear to the other upturned ear, said shoulders positioned within the side walls of the cover member, a pair of spaced terminals extending through the top wall to the interior of the thermostat, a spring member mounted on one of the terminals on the inside of the cover member and having a switch contact, a second spring member mounted on the other terminals on the inside of the cover member and having a second switch contact, a resilient control member bent to form a flat platform at the intermediate part of the resilient member, legs extending therefrom downwardly at an angle to the platform and a flat toe at the end of each leg, said toe secured to the bar member between the shoulders, said bar member having a relatively high coefficient of expansion, said resilient member having a relatively low coefficient of expansion, said resilient member at the said platform normally positioned against the second mentioned spring member, said second mentioned spring member tensioned against said resilient member, said resilient member in normal position tensioned against the second mentioned spring member to hold the second mentioned switch contact against the first mentioned switch contact in switch closing position, said first mentioned spring member tensioned away from the second mentioned spring member, each leg being cut out intermediate the toe and the platform to provide a smaller area of metal intermediate the toe and the platform than at any other part of the leg and thereby form an intermediate weakened section, said legs in normal position being straight and unbowed, upon expansion of said bar member, the platform of said resilient member being moved downwardly to cause said second mentioned electrode to move away from said first mentioned electrode, each leg thereby being convexedly bowed.

2. In a thermostat, a cover member open at the bottom and having a top wall, end walls and side walls depending therefrom, a bar member having upturned ears at each end thereof, said bar member removably positioned inside of the cover member with the upturned ears against the end walls thereof, cooperating means on the end walls and ears for locking the bar member inside the cover member, means on the side walls for securing the cover member to a support and a resilient member bent to form a flat platform at the center, legs extending outwardly therefrom at an angle to the platform and a flat toe at the end of each leg, said toe secured to the bar member, said bar member having a relatively high coefficient of expansion and said resilient member, having a relatively low coefficient of expansion, the said legs intermediate a toe and the platform being arcuately cut out to provide a smaller and thereby weakened section extending into a larger and thereby strengthened section at the toe and at the platform, a pair of switch terminals on the outside of the cover member and extending through the top wall to the interior of the cover member, and a switch comprising two spring members and a contact on each spring member, one of said spring members mounted in the interior of said cover member on one of said terminals, the other of said spring members mounted on the other of said terminals, said first mentioned spring member being tensioned against the platform, said second mentioned spring member being tensioned away from the first mentioned spring member, in normal position said resilient member holding the contacts on the spring members in switch closing position, each leg in normal position being straight and unbowed, said resilient member, upon expansion of said bar member, permitting said first mentioned contact to move away from said second mentioned contact and open the switch.

FRANK REINGRUBER.

REFERENCES CITED

The following references are of record in the file of this patent:

UNITED STATES PATENTS

| Number | Name | Date |
|---|---|---|
| 490,926 | Roberts | Jan. 31, 1893 |
| 726,490 | Yerrington | Apr. 28, 1903 |
| 1,053,550 | Wright | Feb. 18, 1913 |
| 1,212,260 | Reeve | Jan. 16, 1917 |
| 1,443,601 | Udale | Jan. 30, 1923 |
| 2,087,024 | Dezotell | July 13, 1937 |
| 2,133,309 | Schmidinger | Oct. 18, 1938 |
| 2,217,328 | Barnes | Oct. 8, 1940 |
| 2,235,697 | Cornell | Mar. 18, 1941 |
| 2,248,666 | Fischer | July 8, 1941 |

FOREIGN PATENTS

| Number | Country | Date |
|---|---|---|
| 805,747 | France | Aug. 3, 1936 |
| 847,860 | France | July 10, 1939 |